US012705065B2

(12) United States Patent
Yang et al.

(10) Patent No.: US 12,705,065 B2
(45) Date of Patent: Aug. 11, 2026

(54) METHOD FOR REDUCING INRUSH CURRENT

(71) Applicant: Resideo USA LLC, Golden Valley, MN (US)

(72) Inventors: Silver Yang, Shanghai (CN); Sandy Wu, Shanghai (CN); Juana Peng, Shanghai (CN)

(73) Assignee: Resideo USA LLC, Golden Valley, MN (US)

( * ) Notice: Subject to any disclaimer, the term of this patent is extended or adjusted under 35 U.S.C. 154(b) by 65 days.

(21) Appl. No.: 18/728,525

(22) PCT Filed: Jan. 14, 2022

(86) PCT No.: PCT/US2022/070203
§ 371 (c)(1),
(2) Date: Jul. 12, 2024

(87) PCT Pub. No.: WO2023/136938
PCT Pub. Date: Jul. 20, 2023

(65) Prior Publication Data
US 2025/0060971 A1 Feb. 20, 2025

(51) Int. Cl.
*G06F 9/44* (2018.01)
*G06F 9/4401* (2018.01)

(52) U.S. Cl.
CPC .................................. *G06F 9/4401* (2013.01)

(58) Field of Classification Search
CPC ..................................................... G06F 9/4401
See application file for complete search history.

(56) References Cited

U.S. PATENT DOCUMENTS 6,388,854 B1 5/2002 Berstis et al.
7,475,267 B1 1/2009 Cocosel
(Continued)

FOREIGN PATENT DOCUMENTS

CN 201868077 U 6/2011
EP 0872793 B1 11/2006
(Continued)

OTHER PUBLICATIONS

International Search Report and Written Opinion in PCT International Application No. PCT/US2022/070203 mailed Aug. 2, 2022.

*Primary Examiner* — Zahid Choudhury
(74) *Attorney, Agent, or Firm* — Greenberg Traurig, LLP; Nicholas Martin; David J. Dykeman

(57) ABSTRACT

A control panel for controlling a security system. The control panel may comprise: one or more components; a memory for storing booting instructions, and a processor for executing the stored booting instructions. When carrying out a booting process defined by the booting instructions, the processor may be configured to generate at least one random time-delay value; assign the at least one random time-delay value to at least one booting stage of the booting process; delay the at least one booting stage of the booting process by the at least one time-delay value. Each of the at least one time-delay value may be assigned to one booting stage of the booting process, and each of the at least one booting stage may correspond to booting at least one of the one or more components.

15 Claims, 3 Drawing Sheets

(56) References Cited

U.S. PATENT DOCUMENTS

| | | | | |
|---|---|---|---|---|
| 9,534,330 | B2 | 1/2017 | Rosenbauer | |
| 2015/0006928 | A1* | 1/2015 | Guillot | G06F 1/266 713/320 |
| 2015/0142181 | A1 | 5/2015 | Stachler et al. | |
| 2017/0303369 | A1* | 10/2017 | Thosteson | H05B 47/16 |
| 2019/0065751 | A1* | 2/2019 | Srinivas | G06F 21/575 |
| 2022/0030657 | A1* | 1/2022 | Yamine | H04W 48/12 |
| 2025/0046230 | A1 | 2/2025 | Wu et al. | |
| 2025/0061796 | A1 | 2/2025 | Yang et al. | |

FOREIGN PATENT DOCUMENTS

| | | | |
|---|---|---|---|
| JP | 2014126274 | A | 7/2014 |
| JP | 6044889 | B2 | 12/2016 |
| JP | 2020140527 | A | 9/2020 |
| WO | 2011046589 | A1 | 4/2011 |

* cited by examiner

METHOD FOR REDUCING INRUSH CURRENT

CROSS-REFERENCE TO RELATED APPLICATIONS

This application is a U.S. National Phase patent application under 35 U.S.C. 371 of International Application No. PCT/US2022/070203, Jan. 14, 2022, the entire contents of which is incorporated herein by reference.

FIELD OF THE INVENTION

The present invention generally relates to a method for reducing inrush current, and in particular to how to reduce a total inrush current when powering up a plurality of electronic devices.

BACKGROUND TO THE INVENTION

Inrush current, also known as input surge current or switch-on surge, is the maximum instantaneous input current drawn by an electronic device after it being turned on. For an electronic device, the inrush current created during the startup phase can be many times (e.g., more than 5 times, more than 10 times, or more than 100 times) higher than the operating current required during the steady-state phase. Where a plurality of same or different electronic devices are powered up at the same time e.g., by a central power supply, a huge inrush current will be drawn by the plurality of electronic devices which can result in various problems. For example, in case of the total inrush current exceeding the maximum capacity of the central power supply, some of the electronic devices may not be powered up properly due to insufficient current supply and the central power supply may be cut off or even damaged. This is often observed in commercial or residential apartment buildings where a plurality of electronic devices are installed. Such a plurality of electronic devices may include for example a plurality of safety and/or security systems each having a control panel.

Existing methods for reducing or preventing inrush current for the situation described above rely on deployment of dedicated hardware components, such as delay circuits or delay switches, which are arranged to purposefully delay the start-up of either some components of an electronic device or the whole device. Those methods are often complex to implement and also not cost-effective.

Objects and aspects of the present claimed invention seek to alleviate at least these problems with the prior art.

SUMMARY OF THE INVENTION

According to a first aspect of the present invention, there is provided a control panel for controlling a safety and/or security system. The control panel may comprise: one or more components; a memory for storing booting instructions, and a processor for executing the stored booting instructions. When carrying out a booting process defined by the booting instructions, the processor may be configured to generate at least one random time-delay value; assign the at least one random time-delay value to at least one booting stage of the booting process; delay the at least one booting stage of the booting process by the at least one time-delay value. Each of the at least one time-delay value may be assigned to one booting stage of the booting process, and each of the at least one booting stage may correspond to booting at least one of the one or more components.

In an embodiment, the one or more components may comprise an electrical visual display and wherein the at least one booting stage comprises booting of the electrical visual display.

In an embodiment, the processor may be configured such that the generation of the at least one random time-delay value comprises generating at least one random number.

In an embodiment, the processor may be configured to further convert each of the at least one random number to a corresponding random time-delay value.

In an embodiment, the processor may be configured such that the conversion of each of the at least one random number to a corresponding random time-delay value is obtained through multiplying each of the at least one random number by a time-delay factor.

In an embodiment, the processor may be configured to set a range within which the at least one random number is generated.

In an embodiment, each of the at least one time-delay value may be in the range between 500 microseconds and 60 seconds.

In an embodiment, the processor may be configured such that the assignment of the at least one random time-delay value comprises identifying the booting stage which results in the highest input current.

In an embodiment, the processor may be configured such that the assignment of the at least one random time-delay value further comprises assigning the at least one random time-delay value to at least one booting stage preceding the identified booting stage in which the required input current is highest.

According to a second aspect of the present invention, there is provided a system comprising a plurality of control panels according to any preceding claim; and a central power supply, and optionally a backup battery, configured to provide electrical power to each of the plurality of control panels.

According to a third aspect of the present invention, there is provided a method for reducing a total inrush current when powering up a plurality of control panels by a central power supply, each control panel comprising one or more components, a memory configured to store booting instructions, and a processor. The method may comprise: generating, by the processor of each of the plurality of control panels, at least one random time-delay value; assigning, by the processor of each of the plurality of control panels, the at least one random time-delay value to at least one booting stage of a booting process defined by the booting instructions stored in the memory of each of the plurality of control panels; delaying, by the processor of each of the plurality of control panels, the at least one booting stage of the booting process by the at least one random time-delay value for each of the plurality of control panels. Each of the at least one random time-delay value may be assigned to one booting stage of the booting process carried out in each control panel, and each of the at least one booting stage may correspond to booting at least one of the one or more components of each control panel.

In an embodiment, the generation of the at least one random time-delay value may comprise generating, by the processor of each of the plurality of control panels, at least one random number.

In an embodiment, the generation of the at least one random time-delay value may further comprise converting, by the processor of each of the plurality of control panels, each of the at least one random number to a corresponding random time-delay value.

In an embodiment, the conversion of each of the at least one random number to a corresponding random time-delay value may comprise multiplying, by the processor of each of the plurality of control panels, each of the at least one random number by a time-delay factor.

In an embodiment, the assignment of the at least one random time-delay value may comprise identifying the booting stage which results in the highest input current.

In an embodiment, the assignment of the at least one random time-delay value may further comprise assigning, by the processor of each of the plurality of control panels, the at least one random time-delay value to at least one booting stage preceding the identified booting stage in which the required input current is highest.

Other aspects of the invention comprise a security system comprising the control panel according to the embodiments of the first aspect.

BRIEF DESCRIPTION OF THE DRAWINGS

Embodiments of the present invention will now be described by way of example only and with reference to the accompanying drawings, in which:

FIG. 3 shows a flow diagram of a method for controllably delaying at least one booting stage of a booting process carried out by a security control panel after turned on.

DETAILED DESCRIPTION OF THE EMBODIMENTS

Figure 1:
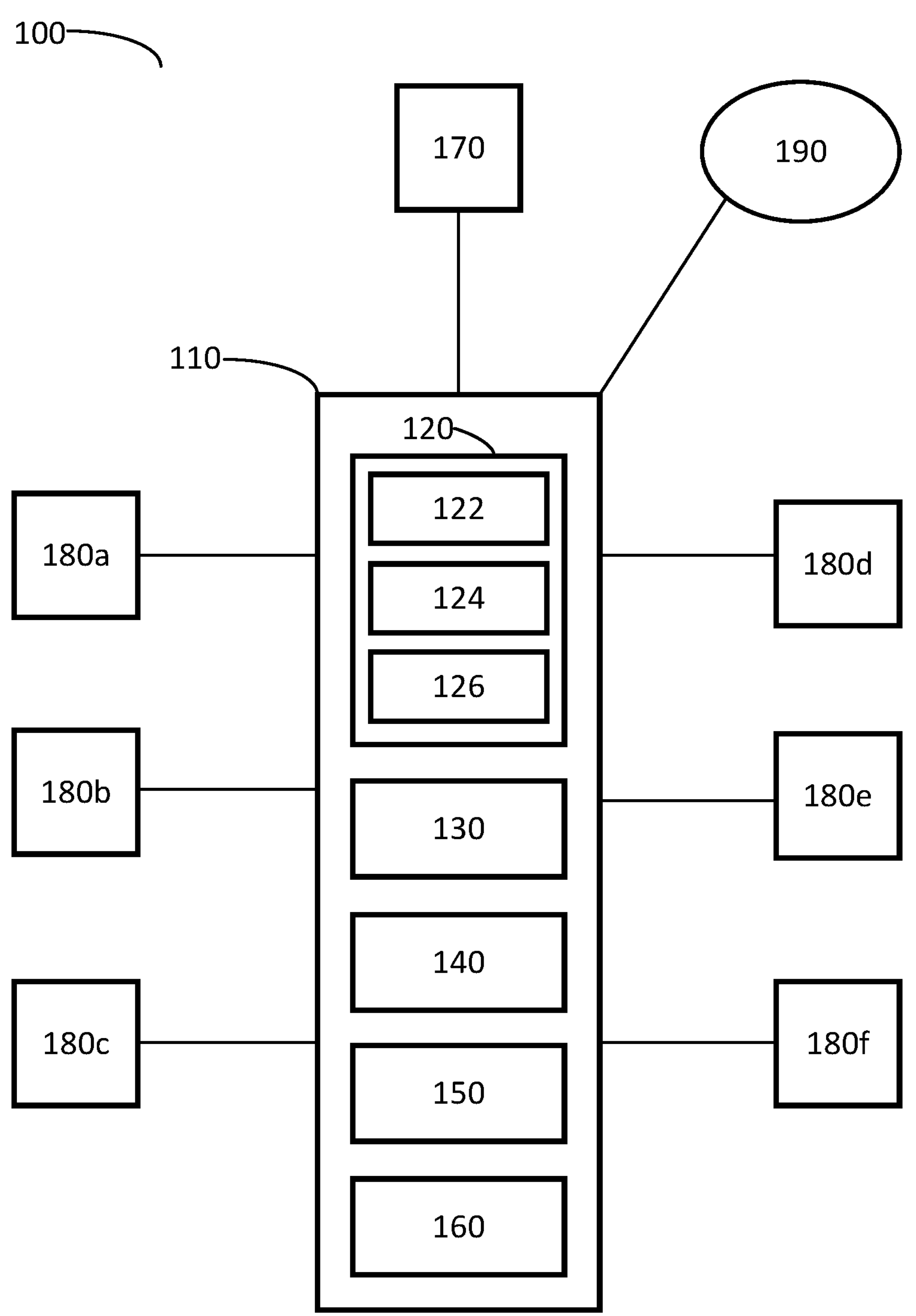
FIG. 1 depicts schematically a functional block diagram of a security system in accordance with an embodiment.
Figure 2:
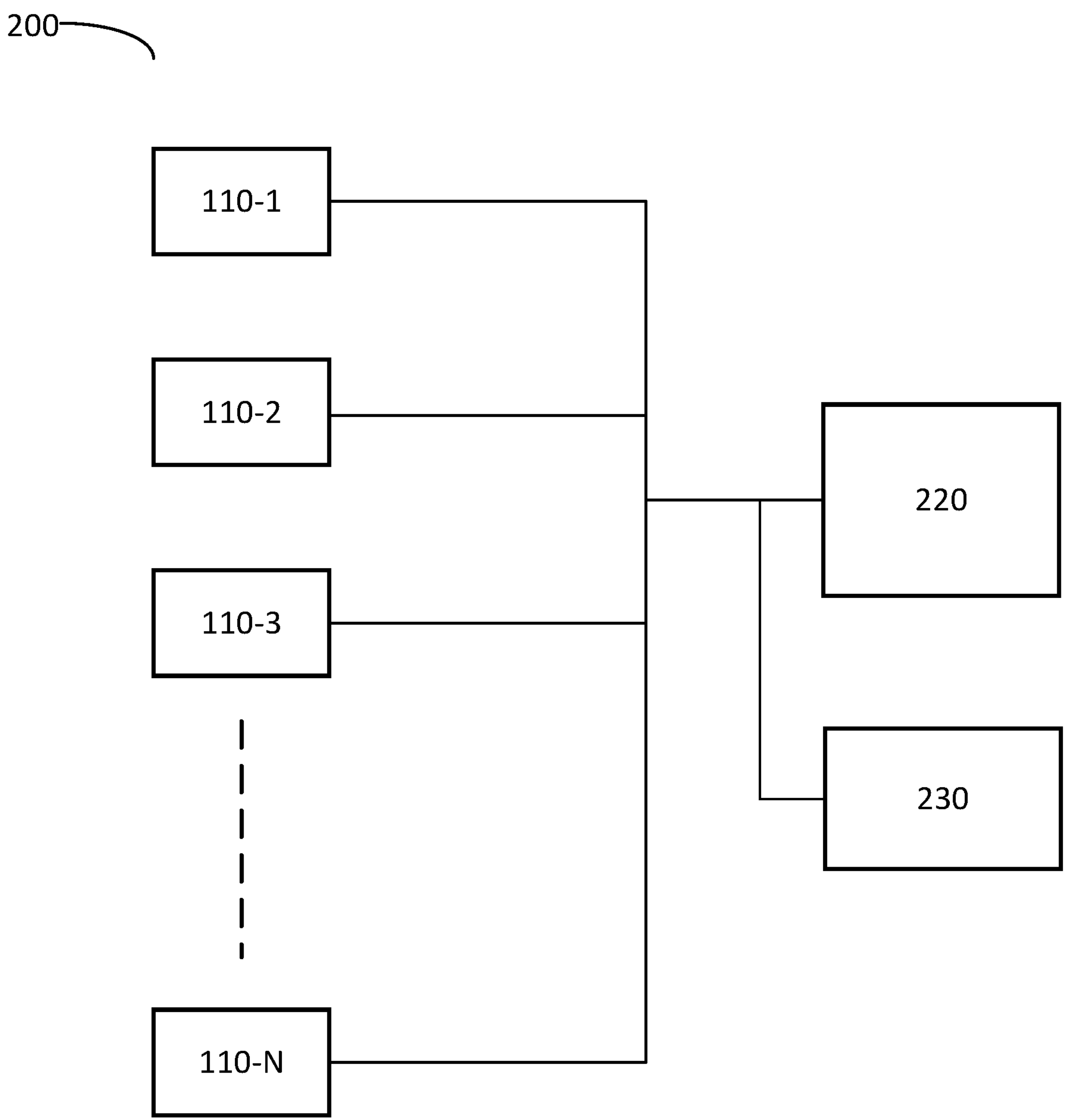
FIG. 2 shows an example configuration of a plurality of security control panels installed in a commercial building.

FIGS. 1 to 2 are related to embodiments of a control panel for controlling a safety and/or security system. The control panel may comprise one or more components, a memory configured to store booting instructions, and a processor; wherein when carrying out a booting process defined by the booting instructions stored in the memory, the processor is configured to: generate at least one random time-delay value; assign the at least one random time-delay value to at least one booting stage of the booting process, delay the at least one booting stage of the booting process by the at least one time-delay value; wherein each of the at least one time-delay value is assigned to one booting stage of the booting process, and wherein each of the at least one booting stage corresponds to booting at least one of the one or more components.

Figure 3:
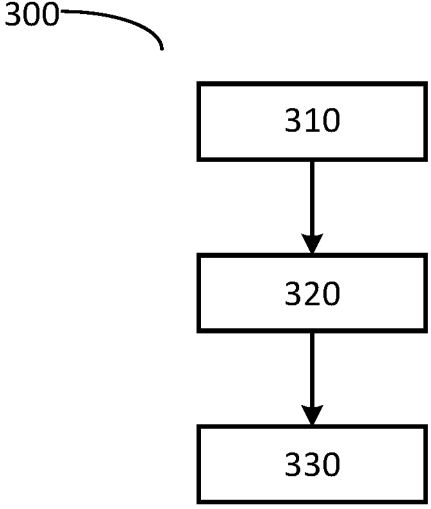

FIG. 3 is related to embodiments of a method for reducing a total inrush current when powering up a plurality of control panels by a central power supply, each control panel comprising one or more components, a memory configured to store booting instructions, and a processor; the method comprising: generating, by the processor of each of the plurality of control panels, at least one random time-delay value; assigning, by the processor of each of the plurality of control panels, the at least one random time-delay value to at least one booting stage of a booting process defined by the booting instructions stored in the memory of each of the plurality of control panels; delaying, by the processor of each of the plurality of control panels, the at least one booting stage of the booting process by the at least one random time-delay value for each of the plurality of control panels; wherein each of the at least one random time-delay value is assigned to one booting stage of the booting process carried out in each control panel, and wherein each of the at least one booting stage corresponds to booting at least one of the one or more components of each control panel.

With reference to FIG. 1, the security system 100 comprises a control panel 110, a plurality of sensors **180*a*-180*f* and a siren 170. The control panel 110 may be communicatively coupled to the components (e.g., the sensors 180*a*-180*f* and siren 170) of the security system 100 via a wired or wireless path. In an embodiment, the control panel may be communicatively coupled (wired or wireless) to a central control center or a remote server 190 via a data network (e.g., the internet). The central control center or remote server 190 may act to monitor and control a plurality of security systems 100** in a certain area.

The sensors **180*a*-180*f* may be of any type of sensors commonly used in a home or business security system, which may include for example, one or more motion sensors 180*a* for detecting when a person enters a room, one or more fire sensors 180*b* for indicating that a fire has been detected, one or more window 180*c* and door sensors 180*d* for indicating that a window or door has been opened, and/or one or more shock sensors 180*e* for detecting a shock that occurs when a burglar strikes the door or window with a hard object. Different and/or additional sensors 180*f*** may be provided.

The control panel 110 may be configured to receive, process and transmit signals. To provide such functionalities, the control panel 110 may comprise a processing unit 130 (e.g., a microprocessor) for processing information (e.g., signals received from the components of the security system 100 and the remote server 190 where available), a memory unit 140 (e.g., transient memory and/or non-transient memory) for storing data (e.g., system information and control programs), a power unit 150 for powering the components of the control panel 110, and a communication unit 160 (e.g., a transceiver) for receiving signals from and transmitting signals to the components of the security system 100 and the remote server where available.

The control panel 110 may further be configured to provide a user interface between the human user and the security system 100. As can be seen in FIG. 1, the user interfacing functionalities may be provided by an integrated user interface unit 120 comprised in the control panel 110. In an embodiment, the user interface unit 120 may comprise an image sensor 122 (e.g., a digital camera), an electronic visual display 124 (e.g., a LCD backlit by LEDs) and a key pad 126. The user interface unit 120 may be used to arm and disarm the security system 100. The image sensor 122 may be used to capture images of the user whenever the user tries to change a setting of the control panel 110, e.g., to arm and disarm the security system 100. Each image may be formed by a plurality of image pixels and may be used for example to verify whether the user is authorized to make such a change. In addition, the image sensor 122 may be configured to monitor an ambient environment (e.g., ambient light level) of the control panel 110. The monitoring of the ambient environment may be achieved by periodically or intermittently taking an image of the ambient environment. The key pad 126 may be used to allow the user to input information so as to alter the setting of the control panel 110.

In an embodiment, the user interface unit 120 may be comprised in a separate user interface device that is located differently to the control panel 110 and is communicatively coupled to the control panel 110 via a wired or wireless path. The separate user interface device may comprise same or similar components as the control panel 110, e.g., a processing unit, a memory, a power unit and a communication unit. In an embodiment, the key pad 126 may be provided by a touch screen which is an integral part of the display 122.

FIG. 2 shows an example arrangement 200 of a plurality of security control panels 110-1, 110-2 . . . 110-N installed in a commercial building. The number N indicates the total number of the security control panels. The plurality of security control panels 110-1, 110-2 . . . 110-N are simultaneously powered by a central power supply 220 which is backed up by a battery system 230. When the plurality of security control panels 110-1, 110-2 . . . 110-N are turned on at the same time (e.g., after a power cut or scheduled maintenance), the resultant total inrush current can be much greater than the maximum capacity of the central power supply 220 or the backup battery system 230. By way of an example, there are 10 security control panels installed respectively on 10 different floors of a commercial building. During the boot-up process, the input current drawn by each security control panel is about 2 A which subsequently drops to about 0.5 A after the security control panel has entered into a steady-state operation. In such a case, the maximum capacity of the central power supply 220 must be at least somewhat larger than 20 A, corresponding to the total inrush current drawn by the 10 security control panels. However, once all the security control panels have started the steady state operation, the total current required by the 10 panels is only 5 A suggesting the central power supply 220 is under-loaded most of the time and thus not cost effective. On the other hand, using instead a more economical central power supply 220 with a lower power rating (e.g., the current rating is lower than 20 A but higher than 5 A) would cause unstable operation of at least some of the security control panels due to lack of sufficient current supply and/or automatic cut off of the central power supply 220.

Embodiments disclosed herein aim to controllably delay at least one booting stage of the booting process by the at least one time-delay value; wherein each of the at least one time-delay value is assigned to one booting stage of the booting process, and wherein each of the at least one booting stage corresponds to booting at least one of the one or more components.

In an embodiment, when turned on, the security control panel 110 may go through for example a typical Linux boot process which comprises the following five high level stages:

Stage 1: when turned on, the processing unit 130 (e.g., central processing unit (CPU)) receives power and starts sequence operations stored in the memory unit 140. The first instruction the processing unit 130 runs is to pass control to BIOS (Basic Input/Output System) which runs POST (Power On Self Test) operation and selects first boot device. Once the POST is completed and the first boot device (e.g., HDD (Hard Disk Drive)) is selected, BIOS will give control back to the processing unit 130.

Stage 2: after getting back control from BIOS, the processing unit 130 starts the boot loader stage by first loading MBR of the first boot device (e.g., HDD). MBR contains information about the bootloader such as primary boot loader code which provides boot loader information and location details of actual boot loader code on the hard disk. Once the processing unit 130 obtains such information, it will continue the boot loader stage.

Stage 3: with the information obtained at stage 2, the processing unit 130 loads GRBU (Grand Unified Bootloader) into the memory unit 140 (e.g., RAM (Random-Access Memory)). GRBU then loads the user-selected or default kernel into the memory unit 140 (e.g., RAM) and passes control on to the kernel.

Stage 4: once loaded, kernel first (if compressed) decompresses itself and subsequently performs the majority of system setup such as interrupts, the rest of memory management, and device and driver initialization. At this stage, many high current drawing hardware components of the security control panel 110 are either enabled or become fully functional, thereby resulting in a high inrush current. For example, memory components of the memory unit 140 will run at full speed, the electronic visual display 124 will be enabled/turned on (e.g., in case of a LCD, by enabling the backlight). Kernel will then execute INIT (initialization) process.

Stage 5: during INI process, kernel executes scripts to provide various non-operating system services and structures and form the user environment.

Note that the booting process described above is only an example process. The idea of controllably delaying at least one booting stage of the booting process is equally applicable for other different booting processes.

Referring to the above-described booting process, since the high inrush current is predominantly created at a particular stage, i.e. stage 4, where high current drawing components are enabled, it is thus desirable to controllably delay the start of such stage for at least some of the plurality of security control panels 110-1, 110-2 . . . 110-N so as to prevent the buildup of the huge inrush current at turn on. As such, the total input current drawn from the central power supply 220 can be significantly reduced which in turn allows a more economical power supply with a lower power rating to be used.

With reference to FIG. 3, in an embodiment, the memory unit 140 of the security control panel 110 may store a delay control program which comprises instructions for controllably delaying at least one booting stage of the booting process of the security control panel 110. The instructions, when executed, may cause the processing unit 130 to perform for example the following three steps.

Step 310: generating at least one random time-delay value. In an embodiment, the processing unit 130 may command a random number generator to generate one or more random numbers. The random number generator may be in the form of a hardware device or software algorithm. In an embodiment, the processing unit 130 may further convert each random number into a time-delay value. In an embodiment, the conversion of each random number may be achieved by multiplying the random number with a predefined time-delay factor. The range of the random numbers and the time-delay factor may be flexibly chosen insofar as the resultant time-delay value falls within a desired range. In cases where one of the two has been set, the other one will be chosen such that the resultant range of the time-delay value falls within the desired range.

The range of the time-delay value may be between 500 microseconds (μs) and 60 seconds(s), between 500 μs and 10 s, between 1 millisecond (ms) and 5 s, between 100 ms and 5 s, or between 100 ms and 1 s. In some cases, random numbers may be generated in a predefined range which may be, for example, between 1 and 10000, between 1 and 1000, between 1 and 100, between 1 and 50, or between 1 and 10. In some cases, the time-delay factor may be for example 1 μs, 10 μs, 100 μs, 500 μs, 1 ms, 10 ms, 100 ms, or 500 ms. In some example implementations, the random number range may be between 1 and 10, and the time-delay factor may be 200 ms. In different example implementations, the random number range may be between 1 and 100, and the time-delay factor may be 50 ms or 20 ms. In different example implementations, the random number range may be between 1 and 1000, and the time-delay factor may be 60 ms, 30 ms or 10 ms.

Since the one or more random numbers are generated independently in each security control panel 110, it is possible that the random number(s) generated in one of the plurality of security control panels is (are) same as the random number(s) generated in one or more of the other security control panels. Hence, in an embodiment, the range of the random numbers may be set in proportion to total number N of the security control panels 110-1, 110-2 . . . 110-N that are powered by the central power supply 220 so as to avoid many independently generated random numbers being the same.

For example, the range of the random numbers may be set in such a way that its lower limit is always 1 and its upper limit is a number determined by multiplying the total number N of the security control panels with a scaling factor. The scaling factor may be any integer equal to or greater than 10, for example, 10, 50, 100, 500, or 1000. The larger the scaling factor, the less chance for same random numbers to be respectively generated in different security control panels 110. The random number range of each security control panel 110 may be reconfigurable e.g., during its installation. In such a case, a suitable scaling factor may be determined in accordance with the total number of the security control panels that have been installed and may subsequently be input to each of the installed security control panels 110-1, 110-2 . . . 110-N to set the random number range. Thus, in an embodiment, upon installation, the total number of the installed security control panels 110-1, 110-2 . . . 110-N may be input to each security control panel 110 so as to allow the scaling factor and thus the random number range to be determined. The time-delay factor may either have been preconfigured in production or be subsequently and adaptively set based on the determined random number range so as to ensure the resultant time-delay value falls within a desired range.

Alternatively and in an embodiment, each security control panel 110 may be pre-configured during production to comprise a fixed random number range. The fixed random number range may be for example between 1 and 100000, between 1 and 10000, between 1 and 1000, or between 1 and 100.

Step 320: assigning the at least one random time-delay value to at least one booting stage of the booting process, wherein each of the at least one time-delay value is assigned to one booting stage of the booting process. In an embodiment, the processing unit 130 may assign a single random time-delay value obtained in step 320 to one of the booting stages of the booting process (e.g., as described above). In an embodiment, the assignment of the random time may comprise setting a time-delay parameter to the generated random time-delay value. The time-delay parameter is the parameter which governs the timing of each booting stage of the booting process. Referring back to FIG. 2 and together with the above-described booting process, a single random time-delay value may be assigned to stage 2 or stage 3 of the booting process. In either case, the starting time of stage 4 will be temporally delayed (see step 330 below). In an embodiment, two or more time-delay values may be generated and each may subsequently be assigned to a different booting stage of the booting process. For example, in case of two time-delay values being generated, one of the two values is assigned to stage 2 and the other one is assigned to stage 3. As such, the starting time of both stage 3 and stage 4 will be temporally delayed (see step 330 below).

In an embodiment, the step of assigning the at least one random time-delay value (i.e. step 320) may further comprise identifying the booting stage which results in the highest input current being drawn from the central power supply 220. The step of assigning the at least one random time-delay value (i.e. step 320) may further comprise assigning the at least one random time-delay value to at least one booting stage preceding the identified booting stage in which the required input current is highest. In an embodiment, the at least one booting stage to be assigned with the at least one random time-delay value may be the one immediately preceding the identified booting stage requiring the highest input current.

Step 330: delaying the at least one booting stage of the booting process by the at least one time-delay value, wherein each of the at least one booting stage corresponds to booting at least one of the one or more components (e.g., booting of the electronic visual display 124 in stage 4 and enabling full speed running of the memory unit 140). After being assigned with a time-delay value, the corresponding booting stage is temporally delayed by a period of time determined by the time-delay value. In an example implementation, a time-delay value of 500 ms has been generated and subsequently assigned to stage 3 of the booting process (e.g., as described above). After all the stage 3 tasks have been completed, the booting process stays in stage 3 for an additional period of 500 ms rather than immediately progressing to the subsequently stage, i.e. stage 4. In another example implementation, a first time-delay value of 300 ms and a second time-delay value of 400 ms have been generated and subsequently assigned to stage 2 and stage 3, respectively. As a result, the booting process stays in stage 2 for an additional period of 300 ms after all the stage 2 tasks have been completed. Similarly, the booting process stays in stage 3 for an additional period of 400 ms after all the stage 3 tasks have been completed. Consequently, the starting time of stage 4 is delayed by a total period of 700 ms with respect to the case where no time delay is applied.

Note that, despite the foregoing embodiments are described in connection with a security system, the method is equally applicable for reducing a total inrush current when powering up a plurality of electronic devices other than control panels. Note that, the above description is for illustration only and other embodiments and variations may be envisaged without departing from the scope of the invention.

The invention claimed is:

1. A control panel for controlling a safety and/or security system, comprising:

one or more components;

a memory for storing booting instructions, and a processor for executing the stored booting instructions, wherein when carrying out a booting process defined by the booting instructions, the processor is configured to:

generate at least one random time-delay value;

assign the at least one random time-delay value to at least one booting stage of the booting process; and delay the at least one booting stage of the booting process by the at least one time-delay value, wherein each of the at least one time-delay value is assigned to one booting stage of the booting process, and wherein each of the at least one booting stage corresponds to booting at least one of the one or more components.

2. A control panel as claimed in claim 1, wherein the one or more components comprise an electrical visual display and wherein the at least one booting stage comprises booting of the electrical visual display.

3. A control panel as claimed in claim 1, wherein the processor is configured such that the generation of the at least one random time-delay value comprises generating at least one random number.

4. A control panel as claimed in claim 3, wherein the processor is configured to further convert each of the at least one random number to a corresponding random time-delay value.

5. A control panel as claimed in claim 4, wherein the processor is configured such that the conversion of each of the at least one random number to a corresponding random time-delay value is obtained through multiplying each of the at least one random number by a time-delay factor.

6. A control panel as claimed in claim 3, wherein the processor is configured to set a range within which the at least one random number is generated.

7. A control panel as claimed in claim 1, wherein each of the at least one time delay value is in the range between 500 microseconds and 60 seconds.

8. A control panel as claimed in claim 1, wherein the processor is configured such that the assignment of the at least one random time-delay value comprises identifying the booting stage which results in the highest input current.

9. A control panel as claimed in claim 1, wherein the processor is configured such that the assignment of the at least one random time-delay value further comprises assigning the at least one random time-delay value to at least one booting stage preceding the identified booting stage in which the required input current is highest.

10. A system, comprising:

a plurality of control panels according to any preceding claim; and a central power supply, and optionally a backup battery, configured to provide electrical power to each of the plurality of control panels.

11. A method for reducing a total inrush current when powering up a plurality of control panels by a central power supply, each control panel comprising one or more components, a memory configured to store booting instructions, and a processor; the method comprising:

generating, by the processor of each of the plurality of control panels, at least one random time delay value;

assigning, by the processor of each of the plurality of control panels, the at least one random time-delay value to at least one booting stage of a booting process defined by the booting instructions stored in the memory of each of the plurality of control panels; and delaying, by the processor of each of the plurality of control panels, the at least one booting stage of the booting process by the at least one random time-delay value for each of the plurality of control panels, wherein each of the at least one random time-delay value is assigned to one booting stage of the booting process carried out in each control panel, and wherein each of the at least one booting stage corresponds to booting at least one of the one or more components of each control panel.

12. A method as claimed in claim 11, wherein the generation of the at least one random time-delay value comprises generating, by the processor of each of the plurality of control panels, at least one random number.

13. A method as claimed in claim 12, wherein the generation of the at least one random time-delay value further comprises converting, by the processor of each of the plurality of control panels, each of the at least one random number to a corresponding random time-delay value.

14. A method as claimed in claim 10, wherein the assignment of the at least one random time-delay value comprises identifying the booting stage which results in the highest input current.

15. A method as claimed in claim 14, wherein the assignment of the at least one random time-delay value further comprises assigning, by the processor of each of the plurality of control panels, the at least one random time-delay value to at least one booting stage preceding the identified booting stage in which the required input current is highest.

* * * * *